US008611604B2

(12) United States Patent
Fujiyoshi

(10) Patent No.: US 8,611,604 B2
(45) Date of Patent: Dec. 17, 2013

(54) OBJECT DETECTION DEVICE

(75) Inventor: Hironobu Fujiyoshi, Kasugai (JP)

(73) Assignee: Chubu University Educational Foundation, Kasugai (JP)

( * ) Notice: Subject to any disclaimer, the term of this patent is extended or adjusted under 35 U.S.C. 154(b) by 58 days.

(21) Appl. No.: 13/375,391

(22) PCT Filed: Jun. 2, 2010

(86) PCT No.: PCT/JP2010/059326
§ 371 (c)(1),
(2), (4) Date: Nov. 30, 2011

(87) PCT Pub. No.: WO2010/140613
PCT Pub. Date: Dec. 9, 2010

(65) Prior Publication Data
US 2012/0076361 A1    Mar. 29, 2012

(30) Foreign Application Priority Data

Jun. 3, 2009 (JP) ................................. 2009-133698

(51) Int. Cl.
*G06K 9/00* (2006.01)
(52) U.S. Cl.
USPC .......................................... 382/103; 382/154
(58) Field of Classification Search
USPC ............................................... 382/103, 154
See application file for complete search history.

(56) References Cited

U.S. PATENT DOCUMENTS

| 5,675,377 A * | 10/1997 | Gibas ............................. 348/47 |
| 5,926,294 A * | 7/1999 | Sato et al. ........................ 359/22 |
| 6,419,157 B1 * | 7/2002 | Ehrhart et al. ................. 235/486 |
| 6,539,055 B1 * | 3/2003 | Hazra ...................... 375/240.16 |
| 6,603,580 B1 * | 8/2003 | Taillie ............................ 358/474 |
| 8,108,119 B2 * | 1/2012 | Southall et al. ................. 701/96 |
| 8,370,282 B1 * | 2/2013 | Leung et al. .................... 706/20 |

(Continued)

FOREIGN PATENT DOCUMENTS

| JP | 2008-45974 A | 2/2008 |
| JP | 2008-116309 A | 5/2008 |
| JP | 2009-301104 A | 12/2009 |

OTHER PUBLICATIONS

Yuji Yamauchi et al., "People Detection Based on Co-occurrence of Appearance and Spatiotemporal Features," *Meeting on Image Recognition and Understanding (MIRU2007)*, pp. 1492-1497, (2007).

(Continued)

*Primary Examiner* — Stephen R Koziol
*Assistant Examiner* — Shaghayegh Azima
(74) *Attorney, Agent, or Firm* — Posz Law Group, PLC

(57) ABSTRACT

A depth histogram is created for each of a plurality of local regions of the depth image by grouping, according to specified depths, the depth information for the individual pixels that are contained in the local regions. A degree of similarity between two of the depth histograms for two of the local regions at different positions in the depth image is calculated as a feature. A depth image for training that has a high degree of certainty is defined as a positive example, a depth image for training that has a low degree of certainty is defined as a negative example, a classifier that is suitable for classifying the positive example and the negative example is constructed, and an object that is a target of detection is detected in the depth image, using the classifier and based on the feature.

9 Claims, 10 Drawing Sheets

(56) References Cited

U.S. PATENT DOCUMENTS

| | | | |
|---|---|---|---|
| 2001/0018640 A1* | 8/2001 | Matsunaga | 701/301 |
| 2003/0198378 A1* | 10/2003 | Ng | 382/154 |
| 2003/0228034 A1* | 12/2003 | Fox et al. | 382/106 |
| 2004/0119709 A1* | 6/2004 | Strom et al. | 345/421 |
| 2004/0150639 A1* | 8/2004 | Park et al. | 345/419 |
| 2004/0153229 A1* | 8/2004 | Gokturk et al. | 701/45 |
| 2005/0169529 A1* | 8/2005 | Owechko et al. | 382/190 |
| 2005/0184987 A1* | 8/2005 | Vincent et al. | 345/421 |
| 2006/0239558 A1* | 10/2006 | Rafii et al. | 382/181 |
| 2009/0232403 A1 | 9/2009 | Waragai et al. | |
| 2009/0304251 A1* | 12/2009 | Zheng et al. | 382/131 |
| 2010/0014781 A1* | 1/2010 | Liu et al. | 382/285 |
| 2010/0092038 A1* | 4/2010 | Theodore et al. | 382/103 |
| 2011/0044506 A1* | 2/2011 | Chen | 382/103 |
| 2011/0150271 A1* | 6/2011 | Lee et al. | 382/103 |
| 2011/0311101 A1* | 12/2011 | Rafii et al. | 382/103 |
| 2012/0008672 A1* | 1/2012 | Gaddy et al. | 375/240.01 |

OTHER PUBLICATIONS

International Search Report mailed on Jul. 20, 2010 for the corresponding International Patent Application No. PCT/JP2010/059326 (English translation enclosed).

International Preliminary Report on Patentability mailed on Jan. 26, 2012 for the corresponding International Patent Application No. PCT/JP2010/059326 (English translation enclosed).

* cited by examiner

FIG.6

--- Real AdaBoost ALGORITHM ---

1. PRE-PROCESSING

PREPARE TRAINING SAMPLE
   OF N ITEMS $x_1, x_2, \cdots, x_N$ AND
   LABEL $y\{+1, -1\}$ CORRESPONDING TO CLASS 2. INITIALIZATION OF TRAINING SAMPLE WEIGHT $D_t$ $D_{1n} = 1/N$ 3. For $t = 1, 2, \cdots, T$     T NUMBER OF TRAINING ROUNDS For $m = 1, 2, \cdots, M$     M NUMBER OF WEAK CLASSIFIERS 3.1 CREATION OF PROBABILITY DENSITY DISTRIBUTION $W_t$ OF WEAK CLASSIFIER $h_t$ $$W_+^j = \sum_{i:\, j \in J_i^y = +1} D_t(i)$$

$$W_-^j = \sum_{i:\, j \in J_i^y = -1} D_t(i)$$

3.2 WEAK CLASSIFIER $h(x)$ $$h(x) = \tfrac{1}{2} \ln \frac{W_+^j + \epsilon}{W_-^j + \epsilon}$$

3.3 CALCULATION OF EVALUATED LOWEST $Z_m$ FOR SELECTING WEAK CLASSIFIER $$Z_m = 2 \sum_j \sqrt{W_+^j W_-^j}$$

4. SELECTION OF WEAK CLASSIFIER WITH LOWEST $Z_m$ $h_t = \arg \min Z_{t,m}$

5. UPDATING OF TRAINING SAMPLE WEIGHT $D_t(i)$ $D_{t+1}(i) = D_t(i) \exp[-y_i h_t(x_i)]$ 6. NORMALIZATION OF TRAINING SAMPLE WEIGHT $D_t(i)$

7. FINAL CLASSIFIER $$H(x) = \text{sign}\left( \sum_{t=1}^{T} h_t(x) \right)$$

OBJECT DETECTION DEVICE

CROSS REFERENCE TO RELATED APPLICATIONS

This application is a U.S. national stage application of PCT/JP2010/059326 filed on Jun. 2, 2010, and claims priority to, and incorporates by reference, Japanese patent application No. 2009-133698 filed on Jun. 3, 2009.

TECHNICAL FIELD

The present invention relates to an object detection device that detects an object based on an input image.

BACKGROUND ART

In recent years, the implementation of a technology that will comprehend the intentions and assist the movements of people within spaces such as offices, homes, and public facilities has been anticipated. In order for a technology that monitors people in this manner to be implemented, it is necessary to know where the people are within the space, and the implementation of advanced human detection has become an issue.

Much research has been done on human detection, and various types of methods have been proposed. Human detection methods that use known visible-light cameras include many methods that involve statistical training that uses local features and boosting. Human detection methods have also been proposed that use Histogram of Oriented Gradients (HOG) features, which are features that express gradient directions of brightness as local features in the form of a histogram (for example, refer to Non-Patent Literature 1).

CITATION LIST

Non-Patent Literature

[NPL 1]
Yuji Yamauchi, Hironobu Fujiyoshi, Bon-Woo Hwang, Takeo Kanade, "People Detection Based on Co-occurrence of Appearance and Spatiotemporal Features", Meeting on Image Recognition and Understanding (MIRU2007), pp. 1492-1497, 2007.

SUMMARY OF INVENTION

Technical Problem

However, with the known human detection methods that use the brightness gradient directions, it becomes difficult to distinguish a human form against a complex background, and the detection accuracy sometimes decreases. It also becomes difficult to distinguish human forms, and the detection accuracy sometimes decreases, in cases where the human forms overlap and occlusion occurs. Furthermore, with the known human detection methods that use the visible-light cameras, a problem arises in that the sizes of the humans within the image are not known, so when an object is detected, a plurality of rounds of raster scanning of the image are performed as the scale of the detection window is varied, which raises the cost of processing and makes real-time processing difficult.

In light of the foregoing, it is an object of the present invention to improve the accuracy of object detection by an object detection device that detects an object based on an input image. An additional object of the present invention is to increase the speed of the detection of the object by the object detection device.

Solution to Problem

In order to achieve the above-described object, the invention according to a first aspect of the present invention includes a depth image acquisition means, a depth histogram creation means, a feature calculation means, and a classification means. The depth image acquisition means acquires depth information that expresses a distance to an object of image capture and acquires a depth image in which information for individual pixels is the depth information. The depth histogram creation means creates a depth histogram for each of a plurality of local regions of the depth image by grouping, according to specified depths, the depth information for the individual pixels that are contained in the local regions. The feature calculation means calculates, as a feature, a degree of similarity between two of the depth histograms for two of the local regions at different positions in the depth image. The classification means defines a depth image for training that has a high degree of certainty as a positive example, defines a depth image for training that has a low degree of certainty as a negative example, constructs a classifier that is suitable for classifying the positive example and the negative example, and detects in the depth image, using the classifier and based on the feature, an object that is a target of detection.

Using the depth histogram features that use the depth image to identify the depth relationships between local regions in this manner makes it possible to identify the boundary between the target of detection and the background, even in the case of a highly complex background, thus making it possible to improve the accuracy of the object detection.

Furthermore, the invention according to a second aspect is characterized in that the classification means includes an occlusion determination means, an occlusion rate calculation means, and a classifier construction means. In a case where the depth information for one of the pixels that are contained in one of the local regions indicates a depth that is less than a specified threshold value, the occlusion determination means determines that the pixel represents an occlusion. The occlusion rate calculation means calculates an occlusion rate that is a ratio of the pixels in the local region that have been determined to represent an occlusion. The classifier construction means constructs the classifier using the occlusion rate.

Using the depth information from the depth image thus makes it possible to identify the occlusion region easily, so the object detection can be performed while taking the occlusion region into consideration. That makes it possible to improve the accuracy of the object detection even more.

In addition, the invention according to a third aspect is characterized in that the depth image acquisition means is in a fixed position in a three-dimensional space, acquires a full-space depth image that contains the depth image, and acquires from the full-space depth image, by raster scanning the three-dimensional space, the depth image that corresponds to the object.

Using the depth image that includes the depth information makes it possible to specify the size of the target of detection according to the depth in the three-dimensional space. Therefore, in a case where the raster scanning is performed in the three-dimensional space, the depth images that do not match the size of the object can be excluded, so the speed at which the object is detected can be increased over what it is in a case where the raster scanning is performed in a two-dimensional space.

Furthermore, the invention according to a fourth aspect is characterized in that the depth image acquisition means is a time-of-flight (TOF) camera. The TOF camera does not require that a correspondence between images be calculated, as is necessary with a stereo camera, so it can increase the speed at which the object is detected.

BRIEF DESCRIPTION OF DRAWINGS

FIG. 6 is an explanatory figure that shows a Real AdaBoost algorithm.

DESCRIPTION OF EMBODIMENTS

Hereinafter, an embodiment that uses an object detection device according to the present invention will be explained. The object detection device according to the present embodiment analyzes a depth image that includes depth information for each pixel and detects an object that is contained in the depth image. In the present embodiment, the object detection device will be used as a human detection device for detecting a human.

Figure 1:
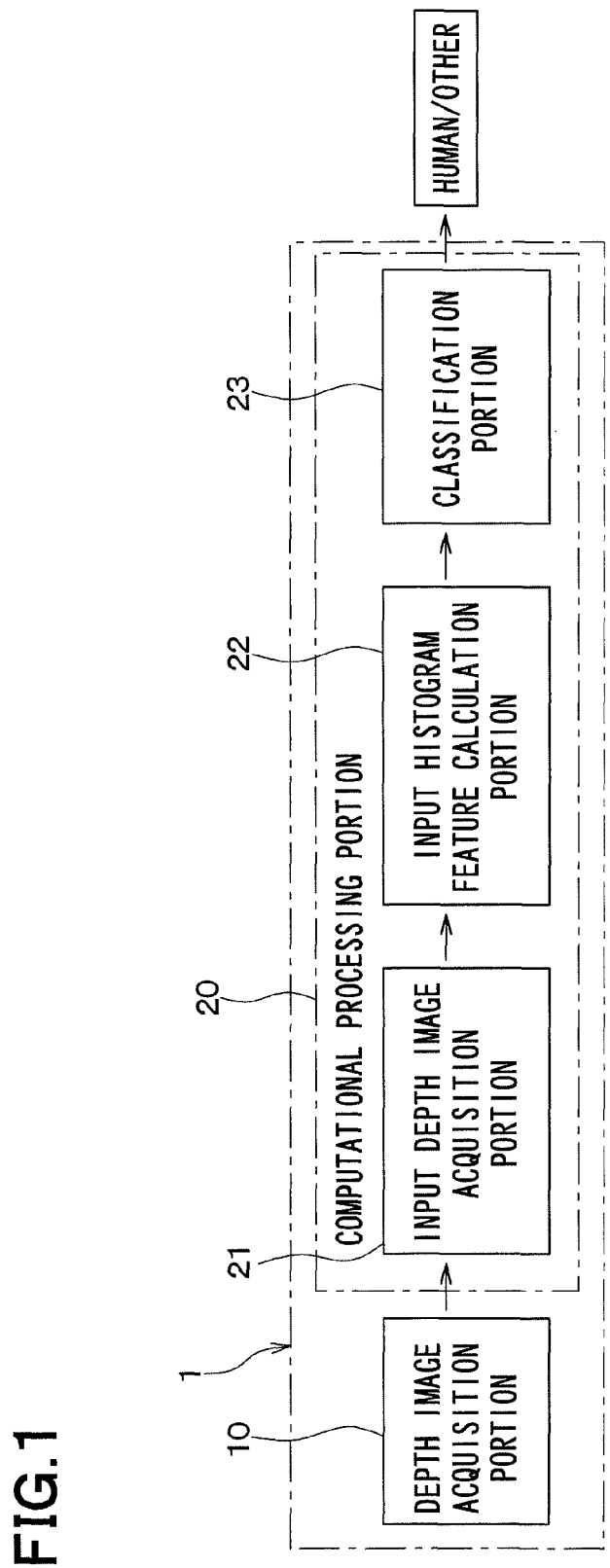
FIG. 1 is a conceptual diagram of a human detection device according to an embodiment of the present invention.

FIG. 1 is a conceptual diagram of a human detection device 1 according to the present embodiment. As shown in FIG. 1, the object detection device according to the present embodiment is provided with a depth image acquisition portion 10 and a computational processing portion 20. The computational processing portion 20 is configured from an input depth image acquisition portion 21, a depth histogram feature calculation portion 22, and a classification portion 23.

The depth image acquisition portion 10 is a depth measurement means such as a camera, a sensor, or the like that is able to detect the distance that is represented by each pixel that makes up the depth image. In the present embodiment, a time-of-flight (TOF) camera is used as the depth image acquisition portion 10. In the present embodiment, the depth image acquisition portion 10 is configured as a fixed camera for which the three-dimensional coordinates are fixed.

The TOF camera is able to measure the distance to an object by measuring the time that is required for infrared light that is emitted from LEDs that are located around the camera to be reflected by the object and observed by the camera. The TOF camera is able to measure the distance that is represented by each pixel that makes up the acquired image. In the depth image that is created by the TOF camera, each pixel is expressed by a different brightness according to the distance from the camera. Unlike a case in which a stereo camera is used, with the TOF camera, it is not necessary to calculate the correspondences between images by using camera calibration and stereo matching, so the processing cost is low, and real-time processing is feasible. In the present embodiment, a MESA SR-3000 is used as the TOF camera. The SR-3000 is able to acquire depth information in real time from 0.3 meters to 7.5 meters (with a resolution of 22 millimeters at 3 meters).

A known computer that is provided with memories such as a ROM, a RAM, and the like, a CPU, and a storage device such as a hard disk or the like can be used as the computational processing portion 20, and it can be configured such that it performs various types of computational processing in accordance with programs that are stored in the storage device. The CPU of the computational processing portion 20 is configured such that it acquires, as an input image, the depth image that has been acquired by the depth image acquisition portion 10 and detects humans by performing various types of processing using the depth image.

The computational processing portion 20 according to the present embodiment is configured such that it detects humans based on the input depth image by using the depth information that the TOF camera acquires to determine the depth relationships between human bodies and the background. Accordingly, in the computational processing portion 20 according to the present embodiment, the input depth image is acquired by the input depth image acquisition portion 21, depth histogram features are calculated by the depth histogram features calculation portion 22, based on the degree of similarity in depth distribution between two local regions in the input depth image, and the depth histogram features are used by the classification portion 23 to detect the humans in the input depth image. The depth histogram groups the depth information for the individual pixels in the local region of the input depth image according to specified depth ranges and shows the frequency of occurrence in the form of a histogram. The depth histogram features express, in the form of characteristic quantities, the degree of similarity between the depth histograms that are produced based on the two local regions in the input depth image.

Figure 2:
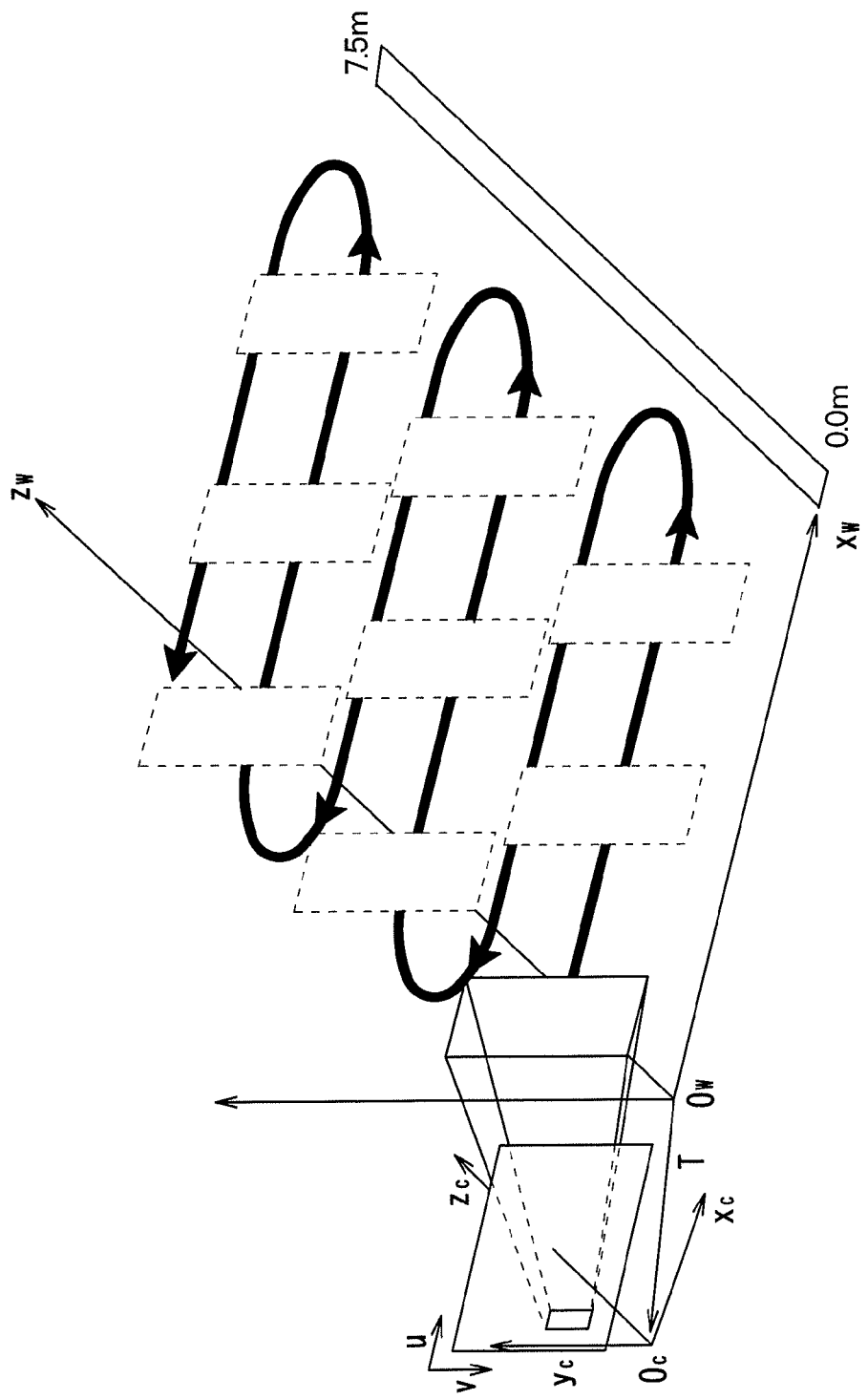
FIG. 2 is an explanatory figure that shows a procedure for scanning detection windows in a depth image.

FIG. 2 is an explanatory figure that shows a procedure by which the input depth image acquisition portion 21 acquires detection windows from the depth image. In FIG. 2, y is the distance in the height direction, x is the distance in the width direction, and z is the distance in the depth direction. In the present embodiment, the TOF camera is placed in a position at a height of 2.5 meters and acquires a full-space depth image in an indoor space that is 4 meters high by 5 meters wide by 7.5 meters deep. The full-space depth image is created with a wide range that corresponds to the entire indoor space, and detection windows that correspond to the size of a human are extracted from the depth image. The classification portion 23 classifies each of the detection windows according to whether or not a human is present. In the present embodiment, the detection windows are extracted, by raster scanning, from the full-space depth image that has been acquired by the TOF camera.

In the example that is shown in FIG. 2, the actual three-dimensional space is raster scanned at the floor level by defining the floor level as being where the coordinate $y_w$ equals zero, then repeatedly scanning, in the $x_w$ direction, a detection window of a specified size while varying the distance $z_w$ from the TOF camera. In the present embodiment, the detection window is defined as being 0.6 meters wide by 1.8 meters high to correspond to the size of a human body, which is the target of detection. The three-dimensional coordinates of the detection window that is produced by the raster scanning of the actual three-dimensional space can be projected onto a coordinate space [u, v]T by using Equation 1.

$$\begin{bmatrix} u \\ v \\ 1 \end{bmatrix} = P \begin{bmatrix} x_w \\ y_w \\ z_w \end{bmatrix} \quad \text{[Equation 1]}$$

$$P = A[R|T]$$

In this case, the matrix P is a perspective projection matrix that is calculated based on an intrinsic parameter A that is obtained by camera calibration, a rotation matrix R that is an extrinsic parameter, and a translation vector T. It is possible to perform the camera calibration for the TOF camera easily, because the global coordinates ($x_w$, $y_w$, $z_w$) in the 4 meters by 5 meters by 7 meters space that correspond to the image coordinates (u, v) can be acquired. The depth histograms are then calculated by treating each of the detection windows in the projected coordinate space as a separate input depth image.

Figure 3:
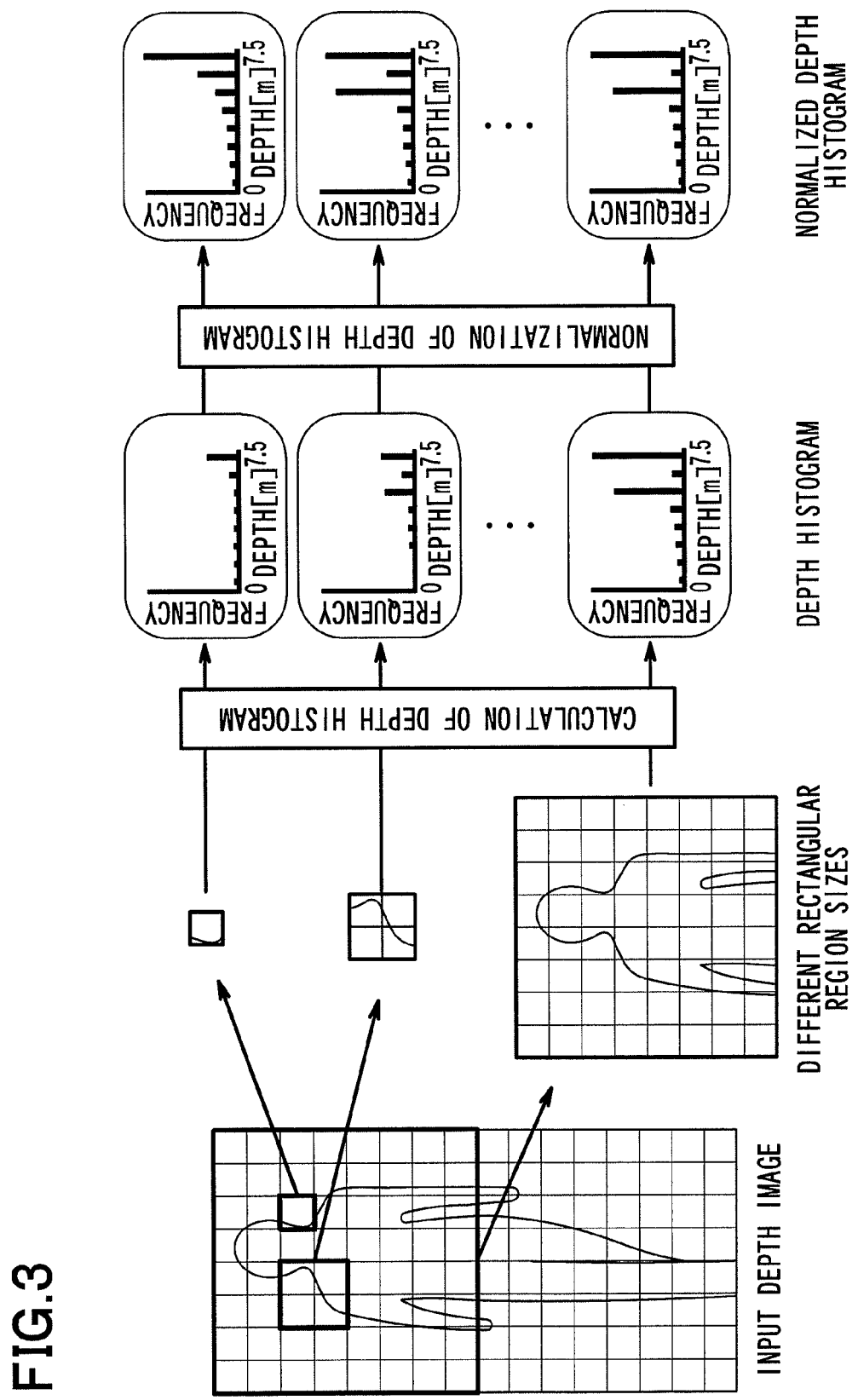
FIG. 3 is a conceptual diagram that shows a procedure for calculating a depth histogram.

FIG. 3 is a conceptual diagram that shows the procedure that the depth histogram features calculation portion 22 uses for calculating the depth histograms. In the present embodiment, each of the input depth images is defined as being 128 pixels (in the vertical direction) by 64 pixels (in the horizontal direction), and each of the input depth images is divided into cells of 8 pixels by 8 pixels. Each of the input depth images is thus divided into 16 cells by 8 cells.

Next, the two local regions for which the depth histogram features will be calculated are selected from the input depth image. In the present embodiment, normalization is performed when the depth histograms are calculated, so it becomes possible to calculate the degree of similarity between the depth histograms for regions of different sizes. The depth relationships in a region such as a person's shoulders and head that cannot be expressed in a single cell can be determined by varying the sizes of the regions for which the degree of similarity of the depth histograms is calculated. The regions are each configured from at least one cell, and they are rectangular in the present embodiment. If the size of the region is varied one cell at a time from 1 cell by 1 cell to 8 cells by 8 cells, a total of 492 rectangular regions exist in the 16 cells by 8 cells input depth image, so 120,786 combinations of rectangular regions (candidates for the depth histogram features) can be produced from the one input depth image.

Next, the depth histograms are calculated based on the depth information for each of the pixels that are contained in each of the selected regions. As described above, the depth histogram groups the depth information for the individual pixels according to specified depth ranges and shows the frequency of occurrence in the form of a histogram. For example, the depth information is available for each of the 64 pixels in a single cell, so the depth histogram that corresponds to the single cell is created based on 64 sets of the depth information.

Figure 4:
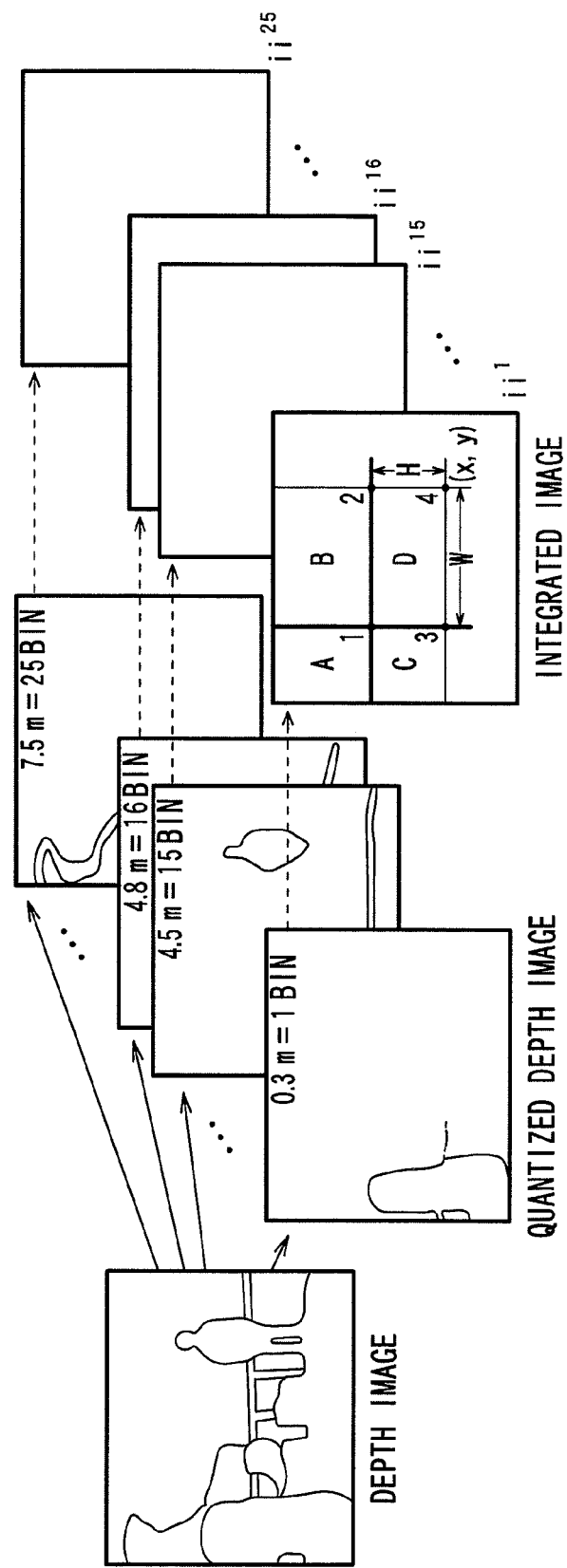
FIG. 4 is an explanatory figure that shows a procedure for calculating a depth histogram using an integral histogram.

FIG. 4 is an explanatory figure that shows a procedure for calculating the depth histograms by using integral histograms. In the present embodiment, the depth histograms are calculated at high speed using the integral histograms in order to limit the cost of calculating the depth histograms. For information on the integral histogram, refer to F. Porikli, "Integral Histogram: A Fast Way to Extract Histograms in Cartesian Spaces", IEEE Computer Visio and Pattern Recognition, pp. 829-836, (2005).

As shown in FIG. 4, first, the depth information for each of the pixels that make up the depth image is quantized at specified intervals. The depth information in units that are smaller than the specified interval is thus grouped at the specified intervals. The specified interval can be set as desired according to the size of the object to be detected, and in the present embodiment, in which human bodies are the objects to be detected, the specified interval is set to 0.3 meters. In the present embodiment, a range from zero to 7.5 meters is divided into the intervals of 0.3 meters, so the depth histograms that are calculated each include 25 bins (segments) in units of 0.3 meters (at 0.3 meters, 0.6 meters, 0.9 meters, . . . 7.5 meters).

Next, 25 quantized images $i^n$ are created, each quantized image in corresponding to the n-th bin, and equation 2 below is used to compute an integrated image $ii^n$ (u, v) based on each of the quantized images $i^n$ (u, v).

$$s^n(u,v) = s^n(u,v-1) + i^n(u,v)$$

$$ii^n(u,v) = ii^n(u-1,v) + s^n(u,v) \quad \text{[Equation 2]}$$

In this case, $s^n$ (u, v) denotes the total number of pixels in the rows of bin n, and (u, v) denotes the sum of $s^n$ for the columns. However, it is assumed that $s^n$ (u, −1)=0 and $ii^n$ (−1, v)=0. In the calculation of the n-th bin $D^n$ of the depth histogram based on the region D of the integrated image in FIG. 4, it is sufficient for the sum to be derived from four points of the n-th integrated image $ii^n$, using Equation 3.

$$D^n = (ii^n(u,v) + ii^n(u-W,v-H)) - (ii^n(u-W,v) + ii^n(u,v-H)) \quad \text{[Equation 3]}$$

As described above, using the integral histograms to calculate the depth histograms makes it possible to calculate the value of the n-th bin of the depth histogram at high speed, irrespective of the size of the region.

Next, the depth histogram for each region is normalized such that the sum of the frequencies of the individual bins is 1 in each of the depth histograms. The normalized depth histograms are produced by dividing the frequencies of the individual bins in each of the depth histograms by the number of pixels in the corresponding region.

Next, the individual bins in two normalized depth histograms p and q that each include 25 computed bins are identified as $p^n$ and $q^n$, and a degree of similarity S between the normalized depth histograms of the two regions is computed. In the present embodiment, the degree of similarity S is computed according to a Bhattacharyya distance that is shown in Equation 4. For information on the Bhattacharyya distance, refer to A. Bhattacharyya, "On a Measure of Divergence between Two Statistical Populations Defined by Probability Distributions", Bull. Calcutta Math. Soc., vol. 35, pp. 99-109, (1943).

$$S = \sum_{n=1}^{m} \sqrt{p_n q_n} \quad \text{[Equation 4]}$$

The degree of similarity S that is computed by Equation 4 is defined as a depth histogram feature. A depth histogram feature vector is computed by using Equation 4 to compute the degrees of similarity S between the depth histograms for any two cells for all combinations of rectangular regions. The depth histogram feature is a feature that is derived from the degree of similarity between different regions, so it is a feature that expresses the relative depth relationship between two regions without being dependent on the distance from the camera.

Figure 5:
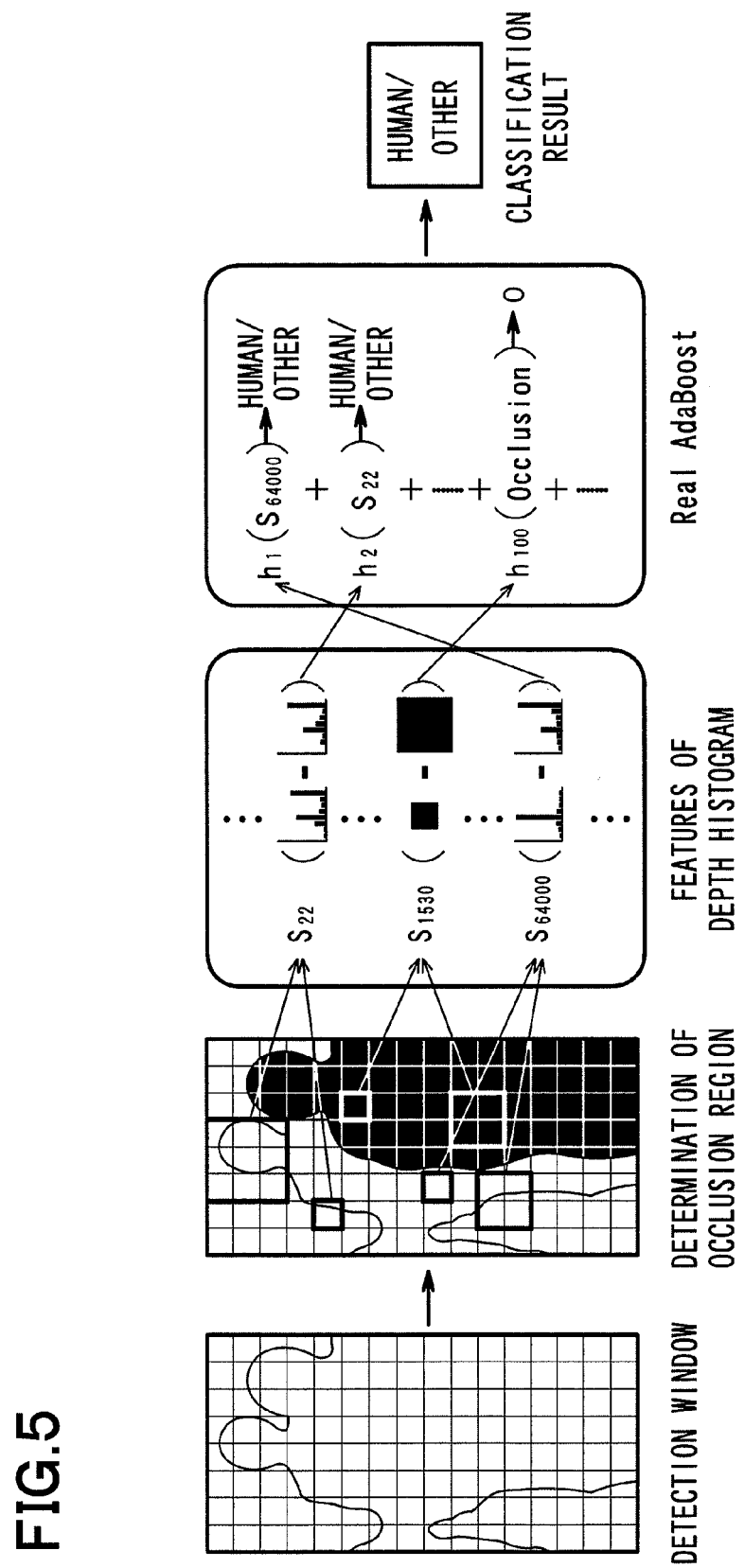
FIG. 5 is an explanatory figure that shows a flow of human detection that uses depth information.

FIG. 5 is an explanatory figure that shows the flow of human detection by the classification portion 23 using the depth information. As shown in FIG. 5, the classification portion 23 uses the depth histogram features to determine whether or not a human is included in the input depth image. The classification portion 23 according to the present embodiment is configured as a cascade type of classifier that utilizes the known Real AdaBoost.

FIG. 6 is an explanatory figure that shows the Real AdaBoost algorithm. A classifier that is built using Real AdaBoost performs retraining by emphasizing data for which classification functions have caused erroneous classification. After the processing has been reiterated for T rounds, a final classification function is created using an ensemble of classification functions of a group of created classifiers.

In the Real AdaBoost classifier, the determination results of all of the weak classifiers (1 for an image that is the target of detection, 0 for an image that is not the target of detection) are supplied to a combining function. The combining function calculates a weighted sum of all of the determination results by using reliability weights that were calculated during the training for each of the corresponding weak classifiers, then outputs a weighted majority result. A determination as to whether or not the image that has been input shows the target of detection is made by evaluating the output value from the combining function. Configuring the classifiers in cascade form makes it possible to reduce the erroneous detection rate without lowering the detection rate for the target of detection.

Training samples (depth images for training) are used for training the classification portion 23. The training samples include positive class samples that are images of the target of detection (images of humans) and negative class samples that are images that are not of the target of detection (images of things other than humans). The positive class samples are positive examples with a high degree of certainty that the target of detection is present, while the negative class samples are negative examples with a low degree of certainty that the target of detection is present. With Real AdaBoost, the degrees of separation between the positive class features and the negative class features are derived from the probability density for each dimension, and the features that allow the greatest separation between the positive class and the negative class are selected as the weak classifiers. Because the degrees of separation are treated as evaluation values during this process, the classification results can be output as real numbers.

In order to derive the output h(x) of the Real AdaBoost weak classifier to which the feature x was input, a probability density distribution W+ is created for the positive class features, and a probability density distribution W− is created for the negative class features (3.1 in FIG. 6). The probability density distributions W± are expressed by one-dimensional histograms and are created based on the weight $D_t$ for the training samples. The probability density distributions W± can be created by computing the features based on the n-th training sample, then adding the weight $D_t(i)$ for the training samples to the number j of the bins in the one-dimensional histograms that correspond to the values of the features. The output $h_t(x)$ of the Real AdaBoost weak classifier is computed using the probability density distributions W± (3.2 in FIG. 6). In this case, ε is a number count for preventing the denominator from becoming zero. An evaluation value $Z_m$ for selecting the weak classifier is also computed using the probability density distributions W± (3.3 in FIG. 6).

Next, the weak classifier for which the evaluation value $Z_m$ is the lowest is selected from among the m number of the weak classifiers (4 in FIG. 6), the training sample weight $D_t(i)$ is updated (5 in FIG. 6), and the training sample weight $D_t(i)$ is normalized (6 in FIG. 6). If the weak classifier that is selected by the training is $h_t(x)$, the final classifier that is built is expressed by Equation 5.

$$H(x) = \text{sign}\left(\sum_{t=1}^{T} h_t(x)\right)$$ [Equation 5]

The classification portion 23 according to the present embodiment builds the final classifier taking occlusion into consideration. In a crowded scene in which a plurality of human figures overlap, it sometimes happens that an occlusion will occur in a region where a human who is the target of detection is present. The depth information that is extracted from an occlusion region may cause the weak classifiers to output erroneous responses. Therefore, the output of a weak classifier that incorporates this sort of occlusion region is not integrated into the final classifier without modification. In the present embodiment, the detection window is raster scanned in an actual three-dimensional space, so the global coordinates of the detection window are known. Accordingly, the sets of the depth information that are acquired from the TOF camera are compared, an object region that is closer to the camera than is the detection window is judged to be an occlusion, and that judgment is utilized in identifying humans.

A threshold value for determining whether an occlusion is present is set using the depth $z_w$ of the detection window during the raster scanning in the actual three-dimensional space. In the present embodiment, the threshold value for determining whether an occlusion is present is defined as $z_w$ minus 0.3 meters. In other words, a position that is 0.3 meters closer than is the depth $z_w$ of the detection window is defined as the threshold value, and anything closer than that is judged to be an occlusion. If each pixel in the detection window is specified as (u, v) and the depth map of each pixel is d (u, v), an occlusion label O (u, v) for any given set of coordinates is expressed by Equation 6.

$$O(u, v) = \begin{cases} 1 & \text{if } d(u, v) < z_w - 0.3 \text{ m} \\ 0 & \text{otherwise} \end{cases}$$ [Equation 6]

In the detection window that is the second from the left in FIG. 5, the occlusion region is shown in black.

Where the ratio of the occlusion regions that are present within a rectangular region $B_t$, which is the object of the t-th weak classifier $h_t(x)$, is defined as an occlusion ratio $OR_t$, $OR_t$ can be derived by Equation 7.

$$OR_t = \frac{1}{B_t} \sum_{(u,v) \in B_t} O(u, v)$$ [Equation 7]

The final classifier H'(x) that takes the occlusion region into consideration by using the occlusion ratio $OR_t$ that is computed by Equation 7 is expressed by Equation 8.

$$H'(x) = \text{sign}\left(\sum_{t=1}^{T} h_t(x) \cdot (1 - OR_t)\right)$$ [Equation 8]

In a case where the ratio of the occlusion regions within the rectangular region $B_t$ is 100% (where the region is completely overlapped), 1−$OR_t$ becomes zero, so the classification result of the weak classifier is not used. In a case where the ratio of the occlusion regions within the rectangular region $B_t$ is 0% (where the region is completely free of overlapping), $1-OR_t$ becomes 1, so the classification result of the weak classifier is used. In a case where the ratio of the occlusion regions within the rectangular region $B_t$ is greater than 0% and less than 100% (where the region is partially overlapped), $1-OR_t$ becomes greater than zero and less than 1, so the classification result of the weak classifier is partially used.

Figure 7:
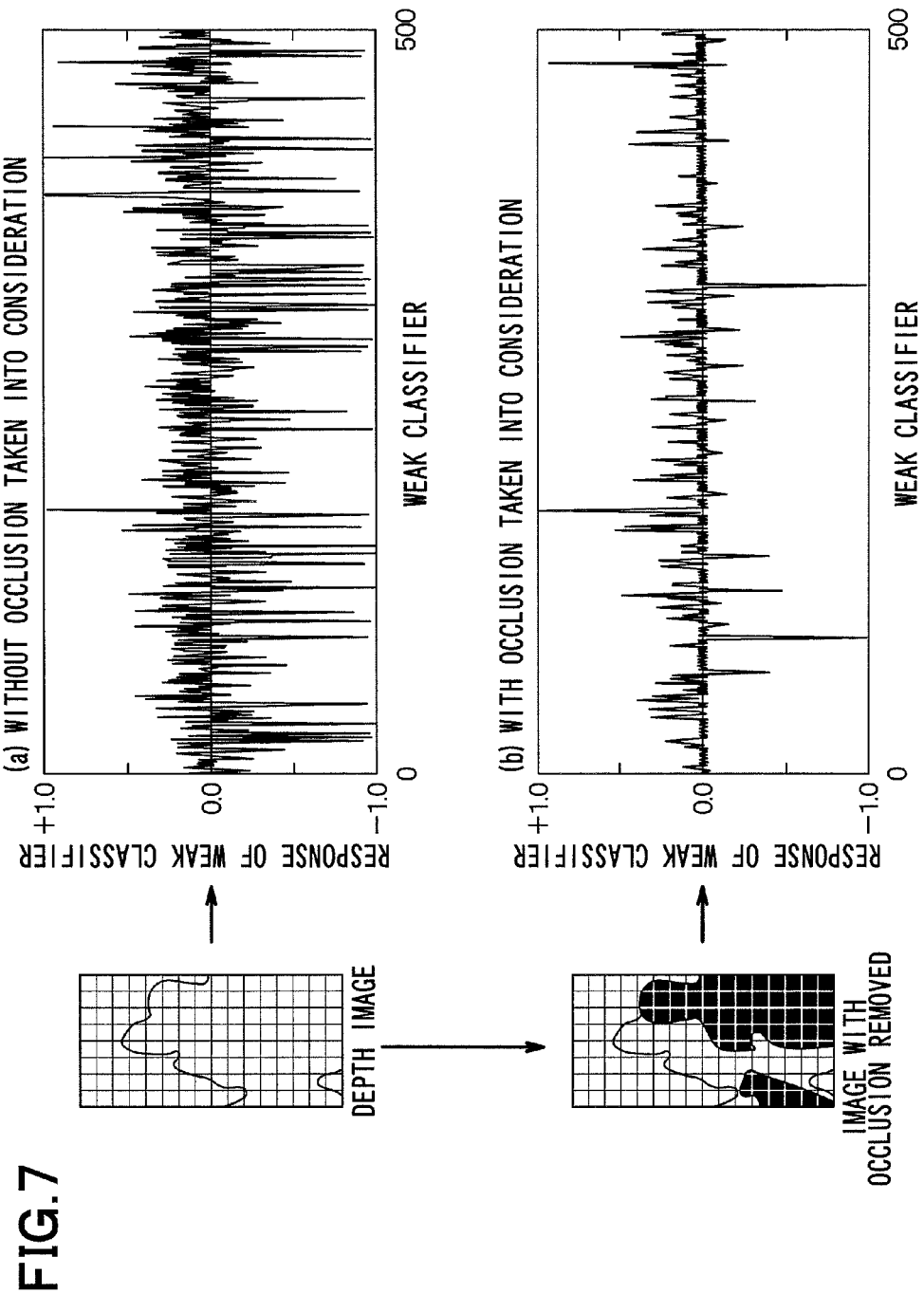
FIG. 7 is an explanatory figure that shows a response of a weak classifier in a case where an input depth image is used in which humans overlap one another.

FIG. 7 is an explanatory figure that shows a response of the weak classifier in a case where an input depth image is used in which humans overlap one another, with (a) showing a case where the occlusion region is not taken into consideration and (b) showing a case where the occlusion region is taken into consideration. FIG. 7(a) shows an example in which the weak classifier that is shown in Equation 5, which does not take the occlusion region into consideration, was used. FIG. 7(b) shows an example in which the weak classifier that is shown in Equation 8, which does take the occlusion region into consideration, was used. FIGS. 7(a) and 7(b) show examples in which 500 weak classifiers were used, and the responses of the individual weak classifiers range from +1 (human) to −1 (other than human). The totals of the responses of the individual weak classifiers are the responses of the final classifiers.

In the example that is shown in FIG. 7(a), the response of the final classifier is −0.27. That is, in a case where the classification is made by the final classifier that does not take the occlusion region into consideration, the outputs of the most of the weak classifiers are negative (classified as other than human), so the final result is an erroneous classification as other than human. In the example that is shown in FIG. 7(b), the response of the final classifier is +15.15. In other words, in a case where the classification is made by the final classifier that does take the occlusion region into consideration, all or a part of the responses of the individual weak classifiers in FIG. 7(a) that are negative (classified as other than human) are not used, so a correct classification as human is made.

The classification portion 23 according to the present embodiment is configured such that it uses mean-shift clustering in the actual three-dimensional space to integrate the detection windows that have been classified as representing humans and defines the human regions in the full-space depth image.

The three-dimensional mean-shift clustering calculates a mean-shift vector m(x) using Equation 9. In this case, x denotes the center coordinate of the moving detection window, and $x_i$ denotes the three-dimensional coordinate of each data item. k is a kernel function, and h is the bandwidth, which is defined as 0.3 meters in the present embodiment.

$$m(x) = \frac{\sum_{i=1}^{n} x_i k\left(\left\|\frac{x-x_i}{h}\right\|^2\right)}{\sum_{i=1}^{n} k\left(\left\|\frac{x-x_i}{h}\right\|^2\right)} - x \qquad [\text{Equation 9}]$$

Figure 8:
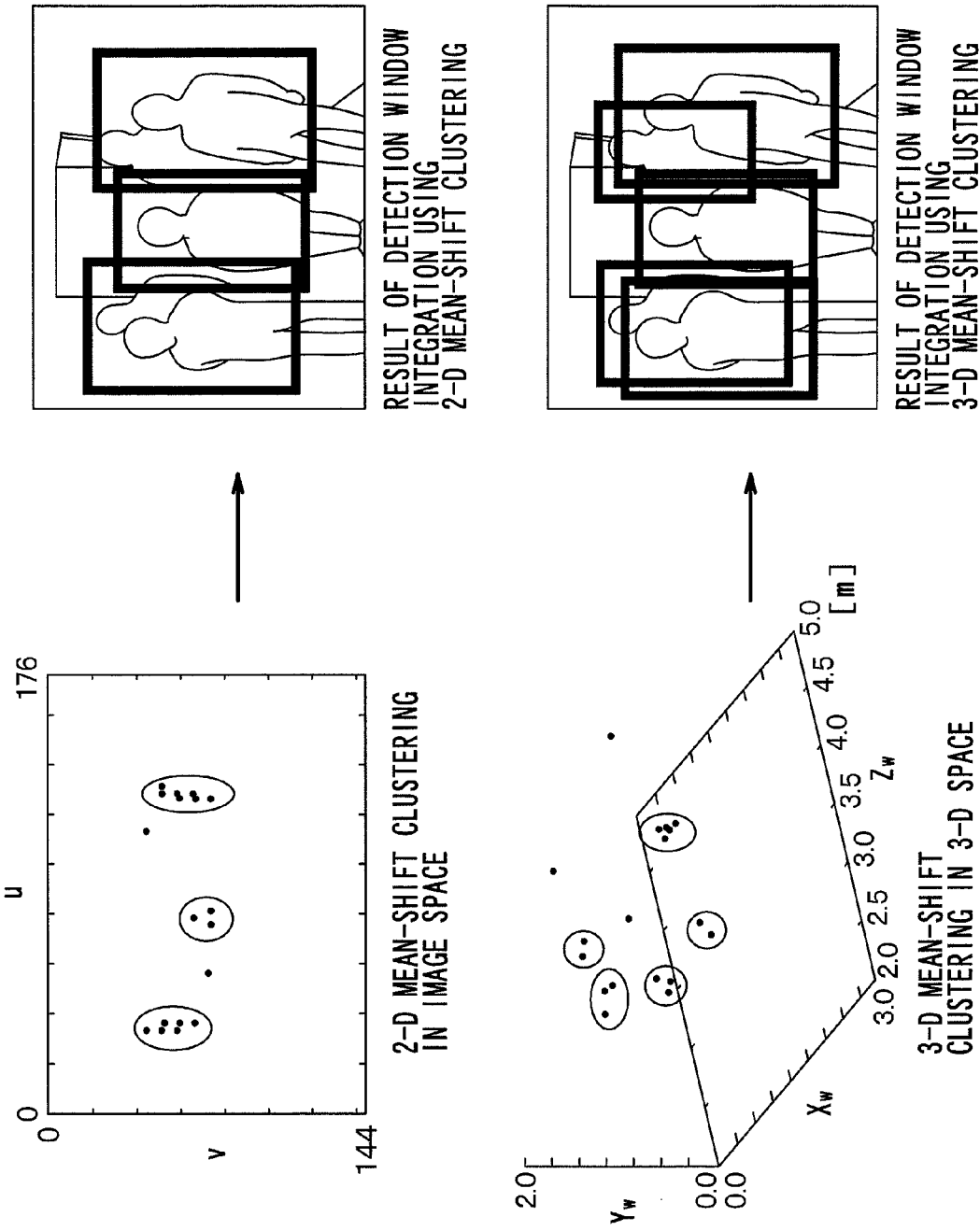
FIG. 8 is an explanatory figure that shows a result of integration of the detection windows by mean-shift clustering.

FIG. 8 is an explanatory figure that shows the results of the integration of the detection windows by mean-shift clustering. In FIG. 8, the upper level shows the integration of the detection windows by two-dimensional mean-shift clustering in the image space, and the lower level shows the integration of the detection windows by three-dimensional mean-shift clustering in the three-dimensional space.

In Non-Patent Literature 1 that is listed in the Background Art section, the inventors have proposed that humans be detected by a known visible-light camera, and that the detection results be formulated, by using mean-shift clustering to integrate the detection windows that have been classified as representing humans. However, as shown in the upper level of FIG. 8, with the mean-shift clustering in the image space, the detection windows are integrated into three regions, despite the fact that five humans are present in the full-space depth image. In other words, with the mean-shift clustering in the image space, the possibility exists that the detection windows will be integrated incorrectly in a case where human forms overlap.

In contrast, in the present embodiment, the mean-shift clustering is performed in the actual three-dimensional space. As shown in the lower level of FIG. 8, with the mean-shift clustering in the actual three-dimensional space, in a case where five humans are present in the full-space depth image, the detection windows are integrated into five regions. That is, with the mean-shift clustering in the actual three-dimensional space, it is possible for the clusters to be separated according to the depth information, even in a case where human forms overlap, so it is possible to inhibit the erroneous integration of the detection windows.

Next, the results of evaluation experiments using the human detection device 1 according to the present embodiment will be explained. For the evaluation experiments, the TOF camera was installed indoors at a height of 2.5 meters, and scenes of people walking and scenes in which a plurality of people overlap were studied. The depth images that were used for the training included 1364 positive training examples and 10,000 negative training examples, all selected from sequence images that had been captured indoors. In the evaluation, 2206 positive evaluation samples and 8100 negative evaluation samples were used that had been created separately from the training examples. The TOF camera was set up to capture images indoors to a maximum depth of 7.5 meters, so it was difficult to use the camera to capture images of the entire bodies of a plurality of humans. Therefore, in the evaluation experiments, the upper bodies (the upper 60% of the bodies) of the humans were the objects of detection.

Figure 9:
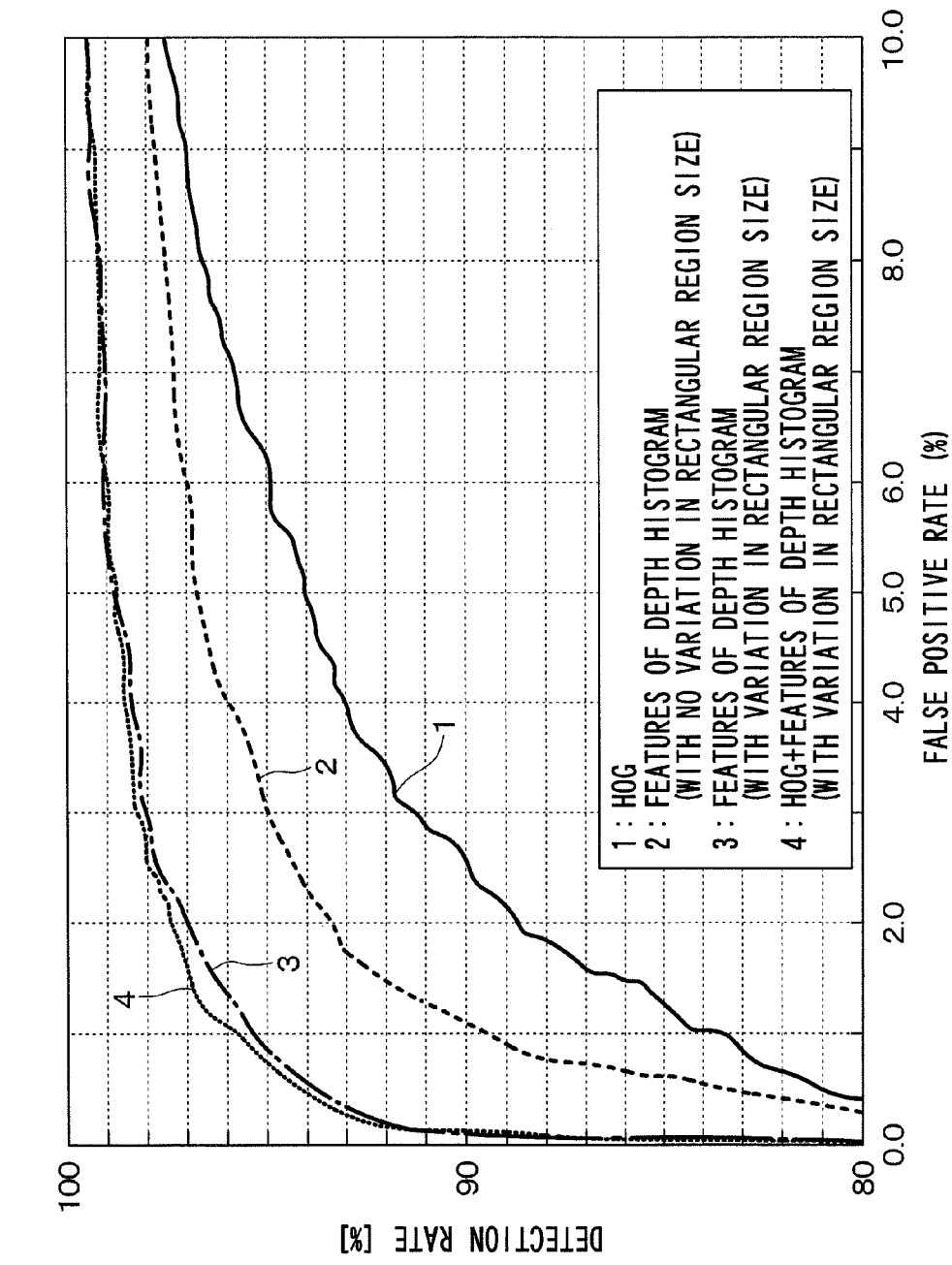
FIG. 9 is an explanatory figure that shows results of evaluation experiments with a human detection device that uses depth histogram features.

FIG. 9 is an explanatory figure that shows results of the evaluation experiments with the human detection device 1 according to the present embodiment. In FIG. 9, the evaluation experiment results are shown for a case in which the rectangular region size in the human detection device 1 according to the present embodiment was made variable and for a case in which it was not made variable. For purposes of comparison, results are shown for evaluation experiments in which the human detection method used the HOG features (the brightness gradient features) of the depth image and for evaluation experiments in which the human detection method used a combination of the depth histogram features and the HOG features.

In FIG. 9, receiver operating characteristic (ROC) curves are used for the comparison of the experiment results. The ROC curves plot the false positive rate on the horizontal axis and the detection rate on the vertical axis. The detection rate can be compared to the false positive rate by varying the classifier thresholds. The detection rate increases, and the false positive rate decreases, toward the upper left of FIG. 9, so it can be seen that detection performance is high.

As shown in FIG. 9, in a case where the depth histogram features are used (without variation of the rectangular region size), the detection rate is 96.8% with a 5.0% false positive rate, a 2.8% improvement in the classification rate over a case where the HOG features of the depth image are used. Using the depth histogram features thus makes it possible to identify the boundary between the target of detection and the background, so the accuracy of human detection can be improved over a case where the brightness gradient features are used.

Furthermore, in a case where the depth histogram features are used (with variation of the rectangular region size), the detection rate is 98.9% with a 5.0% false positive rate, a 2.1% improvement in the classification rate over a case where the depth histogram features are used (without variation of the rectangular region size).

Varying the local region size for which the degrees of similarity among the depth histograms are computed thus makes it possible to determine the depth relationships in a region such as a person's shoulders and head that cannot be expressed in a single cell, so the accuracy of human detection can be improved.

Moreover, in a case where a combination of the HOG features and the depth histogram features (with variation of the rectangular region size) is used, the same sort of classification results are achieved as in a case where only the depth histogram features are used (with variation of the rectangular region size).

Figure 10:
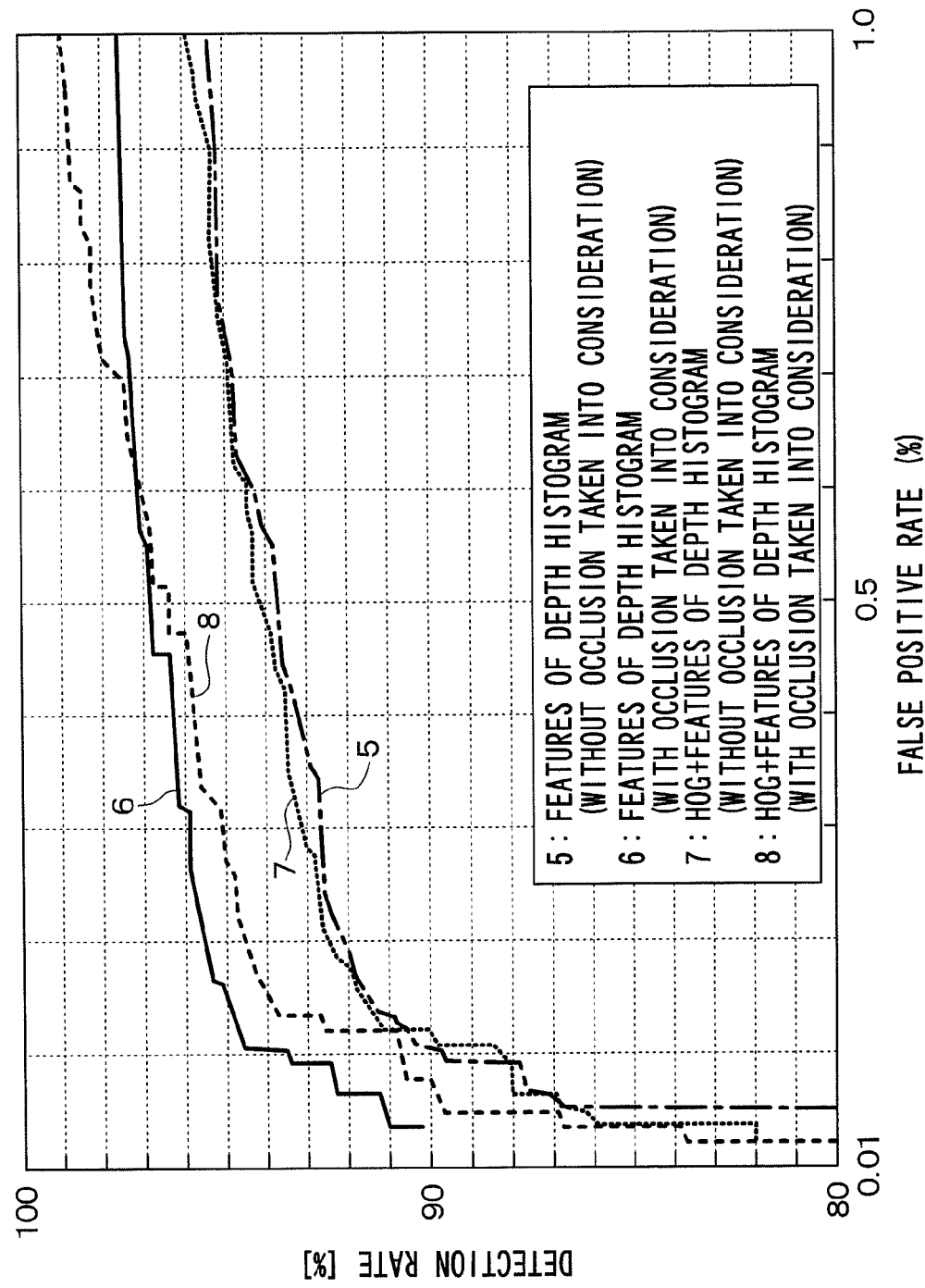
FIG. 10 is an explanatory figure that shows results of evaluation experiments with the human detection device that uses the depth histogram features.

FIG. 10 shows results of evaluation experiments with the human detection device 1 according to the present embodiment, with and without occlusion being taken into consideration. In the evaluation experiments that are shown in FIG. 10, the evaluation experiments were conducted with and without occlusion being taken into consideration, even with the human detection method uses a combination of the HOG features and the depth histogram features. The ROC curves are used in FIG. 10 in the same manner as in FIG. 9.

As shown in FIG. 10, in a case where the depth histogram features are used (with occlusion taken into consideration), the detection rate is 96.9% with a 5.0% false positive rate, a 3% improvement in the classification rate over a case where the depth histogram features are used (without occlusion taken into consideration). Similarly, in a case where the combination of the HOG features and the depth histogram features is used (with occlusion taken into consideration), the detection rate is 96.4% with a 5.0% false positive rate, a 2.3% improvement in the classification rate over a case where the combination of the HOG features and the depth histogram features is used (without occlusion taken into consideration). The influence of the occlusion regions can thus be inhibited by determining the output of the final classifier by using the occlusion rate to weight the weak classifiers that are valid for classification.

Next, the characteristics of the selection of the features by the human detection method according to the present embodiment that uses the depth histogram features will be explained. With the human detection method that uses the HOG features, the fact that the edges of human heads and shoulders are selected means that features are selected such that human outlines are identified. In contrast, among the features that are selected during the initial training of the Real AdaBoost classifiers, many combinations of human regions and background regions are selected, and the boundary lines between the humans and the backgrounds are identified. Furthermore, with the depth histogram features (with variation of the rectangular region size), the regions are selected such that the boundary lines between humans and the background are identified at any given region size. This is thought to be because rough human shapes are identified by identifying the depth relationships between the human outline regions.

Next, the processing time for the human detection device 1 according to the present embodiment will be explained. In a case where the detection windows are raster scanned in a two-dimensional space, the sizes of humans in the image are unknown, so it is necessary to raster scan the image a plurality of times while varying the sizes of the detection windows. It is therefore difficult to do real-time processing, because the number of the detection windows is large, and the processing cost is high. In contrast, in the present embodiment, the raster scanning of the detection windows is done in the actual three-dimensional space. With the three-dimensional raster scanning, the sizes of the humans in the image can be stipulated according to their distances from the camera, so the detection windows that do not match the sizes of the humans can be excluded, and the number of the detection windows can be reduced. It is therefore possible with the three-dimensional raster scanning to significantly reduce the number of the detection windows from what it is with the two-dimensional raster scanning.

With the human detection device 1 according to the present embodiment, where an Intel CPU (3.00 GHz Xeon) is used, the processing times for one frame (361 detection windows) are 24.31 milliseconds (0.067 milliseconds per detection window) for feature calculation, 45.34 milliseconds (0.125 milliseconds per detection window) for classification, and 31.97 milliseconds for integrating the detection windows. Therefore, with the human detection device 1 according to the present embodiment, it is possible to process one frame in approximately 100 milliseconds, making it possible to perform real-time processing at approximately 10 frames per second.

Other Embodiments

An embodiment of the present invention has been explained above, but the present invention is not limited to this embodiment, and improvements can be made as desired, based on the knowledge ordinarily possessed by one skilled in the art, within the scope of what can be easily replaced by one skilled in the art, without being limited by what is stated in the appended claims, insofar as the improvements are within the scope of the appended claims.

For example, in the embodiment that is described above, the target of detection of the object detection device is a human, but the present invention is not limited to this, and the target of detection may also be an object other than a human, such as an animal, an automobile, or the like. Moreover, the target of detection of the object detection device does not necessarily have to be an entire object, and it may also be a portion of an object, such as a person's face, for example.

In the embodiment that is described above, the TOF camera is used as the depth image acquisition portion 10, but the present invention is not limited to this, and a stereo camera, for example, can also be used as the depth image acquisition portion 10, as long as the distance from the camera that is represented by each pixel in the acquired image can be measured.

In the embodiment that is described above, an example was explained in which the fixed camera is used as the depth image acquisition portion 10, but the present invention is not limited to this, and the present invention can be applied even in a case where a moving camera is used as the depth image acquisition portion 10, except for the raster scanning of the three-dimensional space.

In the embodiment that is described above, the classification portion 23 is configured from classifiers using Real AdaBoost, but the present invention is not limited to this, and the classification portion 23 may also be configured from a known support vector machine (SVM) or a neural network.

In the embodiment that is described above, the degree of similarity between the depth histograms for two selected regions is computed using the Bhattacharyya distance, but the present invention is not limited to this, and the degree of similarity between the depth histograms may also be computed by another method.

In the embodiment that is described above, the depth histogram features are computed using the rectangular regions in the depth image, but the present invention is not limited to this, and the depth histogram features may also be computed using regions of any shape within the depth image.

The invention claimed is:

1. An object detection device, comprising:
a depth image acquisition means that acquires depth information that expresses distances to an object of image capture and acquires a depth image in which information for individual pixels is the depth information;
a depth histogram creation means that creates a depth histogram for each of a plurality of local regions of the depth image by grouping, according to specified depths, the depth information for the individual pixels that are contained in the local regions;
a feature calculation means that calculates, as a feature, a degree of similarity between two of the depth histograms for two of the local regions at different positions in the depth image; and
a classification means that defines a depth image for training that has a high degree of certainty as a positive example, defines a depth image for training that has a low degree of certainty as a negative example, constructs a classifier that is suitable for classifying the positive example and the negative example, and detects in the depth image, using the classifier and based on the feature, an object that is a target of detection.

2. The object detection device according to claim 1, wherein the classification means includes
an occlusion determination means that, in a case where the depth information for one of the pixels that are contained in one of the local regions indicates a depth that is less than a specified threshold value, determines that the pixel represents an occlusion,
an occlusion rate calculation means that calculates an occlusion rate that is a ratio of the pixels in the local region that have been determined to represent an occlusion, and
a classifier construction means that constructs the classifier using the occlusion rate.

3. The object detection device according to claim 1,
wherein the depth image acquisition means is in a fixed position in a three-dimensional space, acquires a full-space depth image that contains the depth image, and acquires from the full-space depth image, by raster scanning the three-dimensional space, the depth image that corresponds to the object.

4. The object detection device according to claim 1,
wherein the depth image acquisition means is a time-of-flight camera.

5. The object detection device according to claim 2,
wherein the depth image acquisition means is in a fixed position in a three-dimensional space, acquires a full-space depth image that contains the depth image, and acquires from the full-space depth image, by raster scanning the three-dimensional space, the depth image that corresponds to the object.

6. The object detection device according to claim 2,
wherein the depth image acquisition means is a time-of-flight camera.

7. The object detection device according to claim 3,
wherein the depth image acquisition means is a time-of-flight camera.

8. The object detection device according to claim 5,
wherein the depth image acquisition means is a time-of-flight camera.

9. The object detection device according to claim 1,
wherein the feature calculated by the feature calculation means expresses relative depth relationship between the two of the local regions but the feature is not dependent on the distances to the object.

* * * * *